April 2, 1946.  C. E. GIST  2,397,853
GLUING DEVICE
Filed Feb. 25, 1944   2 Sheets-Sheet 1

Inventor
Clyde Edward Gist
By Clarence A. O'Brien
and Harvey B. Jacobson
Attorneys April 2, 1946.   C. E. GIST   2,397,853
GLUING DEVICE
Filed Feb. 25, 1944   2 Sheets-Sheet 2

Inventor
Clyde Edward Gist

By Clarence A. O'Brien
and Harvey B. Jacobson
Attorneys

Patented Apr. 2, 1946

2,397,853

UNITED STATES PATENT OFFICE 2,397,853

GLUING DEVICE

Clyde Edward Gist, St. Louis, Mo.

Application February 25, 1944, Serial No. 523,881

1 Claim. (Cl. 219—44)

This invention relates to a device for applying glue to the tongued edges of tongue and groove boards to facilitate joining the latter.

The primary object of the present invention is to provide a device of the above kind which is extremely simple and durable in construction, easy to use, and highly efficient in operation.

A further object of the invention is to provide a device of the above kind including an outer casing having an electrical heating unit in the bottom thereof, a glue pot removably mounted in the casing above the heating element so that the latter may heat and keep the glue in the glue pot in the right fluid state, and a grooved wheel journaled in the top of the glue pot for applying the glue to the tongued edge of a tongue and groove board.

A further object of the present invention is to provide a gluing device of the above kind in which simple and efficient means is provided for regulating the thickness of the film of glue on the upper portion of the glue-applying wheel, so that a film of glue of desired and uniform thickness may be applied to the edge of the board.

Other objects and features of the present invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views.

Figure 1:
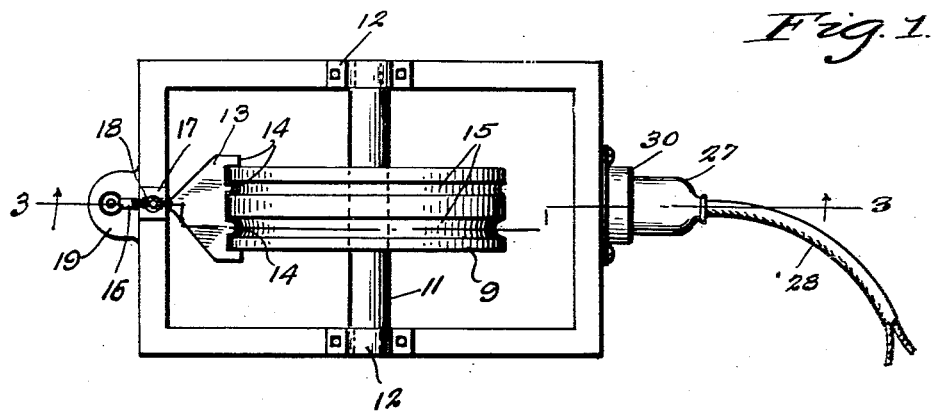
Figure 1 is a top plan view of a gluing device constructed in accordance with the present invention.
Figure 2:
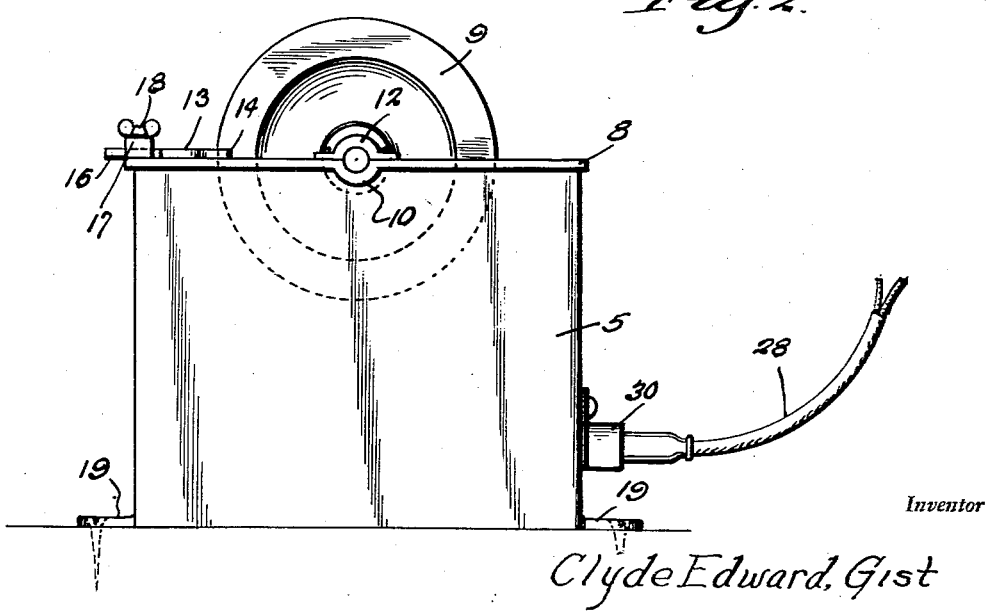
Figure 2 is a side elevational view thereof.

Referring in detail to the drawings, the present device includes an open top outer casing 5 having a flat horizontal electrical heating element 6 disposed therein upon the bottom thereof. The device further includes a glue pot 7 having an outwardly projecting flange 8 along the upper edges of the walls thereof, which flanges are adapted to rest upon the upper edges of the walls of the casing 5 to sustain the glue pot within the casing 5 in spaced relation to and above the heating element 6, as well as in spaced relation to the walls of the casing. Thus, the heating element 6 may effectively heat the glue pot so as to maintain the glue in the latter in a proper fluid state for application to the work. Journaled within the open top of the glue pot 7 is a vertical glue-applying wheel 9 which partially projects into the glue pot and above the latter, as clearly shown. Thus, the lower portion of the wheel 9 is immersed in the glue and as said wheel is rotated it picks up the glue to transfer a film thereof to the tongued edge of a tongue and groove board when the latter is engaged with the portion of the wheel above the top of the glue pot. As shown clearly in Figures 1 to 3, inclusive, the flange 8 is provided with transversely aligned depressed portions 10 forming the lower halves of journal boxes in which the reduced ends of an axle 11 are journaled. This axle has the wheel 9 centrally secured thereon, and the journal boxes include upper cap plates 12 which are removable.

Means is provided to regulate the thickness of the film on the periphery of the wheel 9 above the top of the glue pot, and this means consists of a plate 13 having tongues 14 along an edge thereof adapted to enter spaced grooves 15 provided in the periphery of wheel 9 and to extend inwardly at the sides of the wheel 9, as shown. Plate 13 is carried by a bar or shank 16 slidably extended through a guide 17 provided upon the flange 8 at one end of the device. A set screw 18 extends through this guide to impinge the shank 16 so as to secure the plate 13 in adjusted position. Thus, the regulating device is mounted for horizontal sliding adjustment toward and from the wheel 9, and the spacing between the periphery of wheel 9 and the tongues 14 regulates the thickness of the film of glue allowed to pass upwardly on the wheel 9 past the plate 13. The grooves 15 are respectively of different sizes so that the device may be used to apply glue to the tongued edges of boards having tongues of different sizes or widths.

The casing has projecting ears 19 upon opposite sides of the bottom thereof to receive suitable fastening means, such as screws, whereby the device may be firmly secured upon a support.

Figure 3:
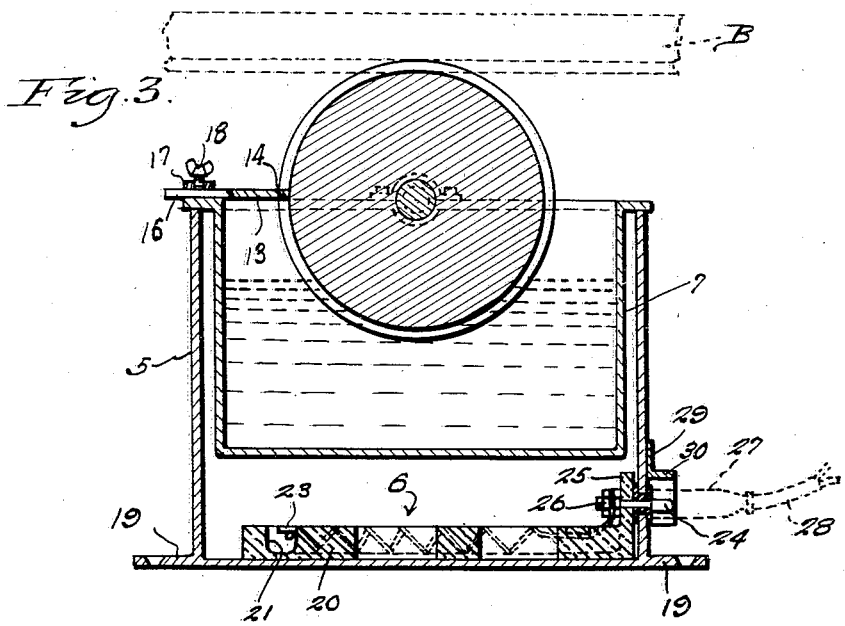
Figure 3 is a central vertical section taken on line 3—3 of Figure 1.
Figure 4:
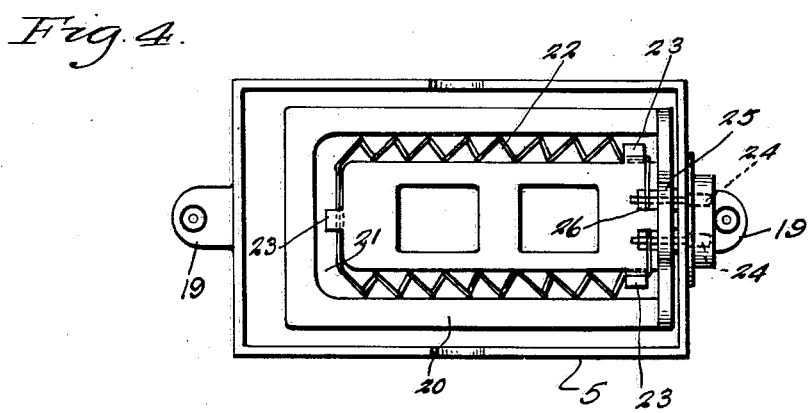
Figure 4 is a top plan view of the device with the glue pot and parts carried thereby removed from the casing.
Figure 5:
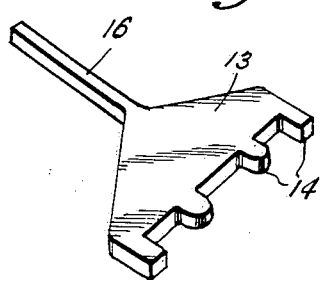
Figure 5 is an enlarged perspective view of the adjustable regulator for regulating the thickness of the film of glue on the upper portion of the glue-applying wheel.

As shown clearly in Figures 3 and 4, the heating element 6 consists of a suitable insulating plate 20 having a groove 21 in the upper face thereof and extending along the sides and one end of the same. A heating coil 22 is disposed in this groove and is held therein intermediate its ends and near the ends thereof by lugs 23 on the plate 20 overlying adjacent portions of the wire forming said coil 22. The ends of the coil 22 are secured to the inner ends of contact pins 24 that are carried by an upstanding flange 25 on one end of the plate 20 and that project outwardly through and are suitably insulated from the adjacent end wall of casing 5. Nuts 26 are threaded on the inner ends of contact pins 24 for securing the ends of coil 22 to said contact pins. Contact pins 24 are adapted to enter the openings of the socket member 27 of a conventional type found upon attachment cords 28, whereby the current for operating the heating element may be derived from an ordinary house wiring system.

A plate 29 is fixed upon the end wall of casing 5 over the projecting ends of contact pins 24 and has an outwardly projecting flange 30 overlying said ends of pins 24 to act as a guard for the latter.

In use, the tongued edge of a board B is engaged with the periphery of wheel 9 at the top of the latter, and the board is moved longitudinally while resting on the wheel 9 so as to turn the latter. As the wheel 9 is turned, the glue picked up thereby from within the glue pot 7 is applied to the tongued edge of the board, and the applied glue is in the form of a film of uniform thickness due to the use of the regulating device 13 to 18, inclusive, previously described. This device removes glue from the sides of wheel 9 near the periphery thereof as well as scraping excess glue from the periphery of wheel 9.

From the foregoing description, it will be seen that I have provided a gluing device of simple, compact and durable construction, and one whose parts are readily separable and may be conveniently assembled or taken apart. It will be further seen that the wheel 9 has grooves of different widths or sizes which are adapted for selective use in accordance with the size of tongue on the board to which glue is to be applied. The device will not readily get out of order and is very convenient to use, in addition to providing means for applying the glue in a very expeditious and practical manner.

It is believed that the construction and operation of the device will be entirely clear to those skilled in the art from the foregoing description, and it is to be understood that the device is capable of minor changes in details of construction, such as fall within the spirit and scope of the invention as claimed.

What I claim as new is:

In a gluing device, an open top glue pot supporting casing, having a flat bottom wall, a flat insulating plate disposed within said casing and upon said bottom wall and having a U-shaped groove in its upper face extending along the sides and one end of the plate, a U-shaped heating coil disposed in said groove, said plate having spaced lugs overlying the heating coil to retain the latter in said groove, an upstanding flange on the other end of the plate, contact pins carried by said flange and having ends projecting outwardly through the adjacent end wall of the casing for engagement in an attachment cord socket, the ends of said heating coil being secured to said contact pins, and a guard secured on said end wall of the casing and overlying the projecting ends of the contact pins.

CLYDE EDWARD GIST.